No. 765,679. PATENTED JULY 26, 1904.
L. REINHARD.
COMBINED ROASTING PAN AND SKELETON SUPPORT.
APPLICATION FILED JUNE 26, 1903.
NO MODEL. 2 SHEETS—SHEET 1.
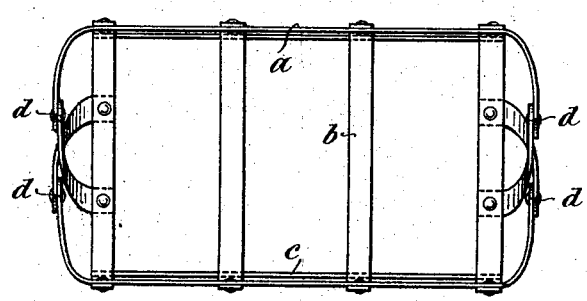
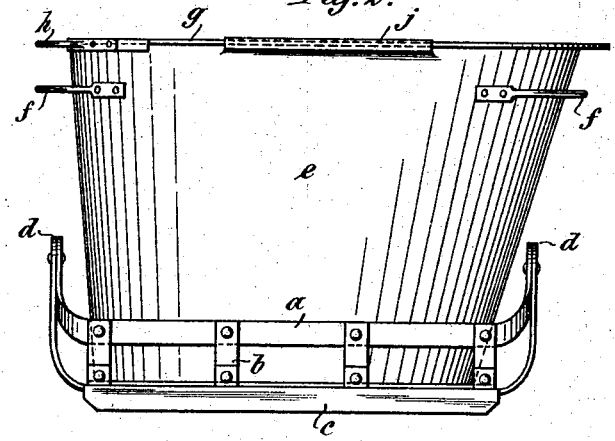
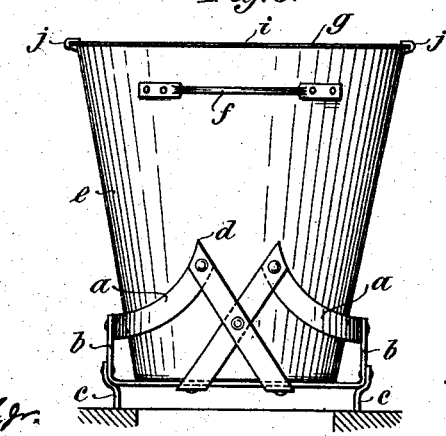

No. 765,679. PATENTED JULY 26, 1904.
L. REINHARD.
COMBINED ROASTING PAN AND SKELETON SUPPORT.
APPLICATION FILED JUNE 26, 1903.
NO MODEL. 2 SHEETS—SHEET 2.
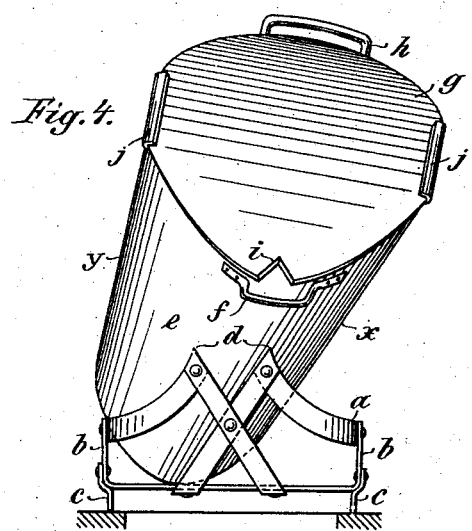
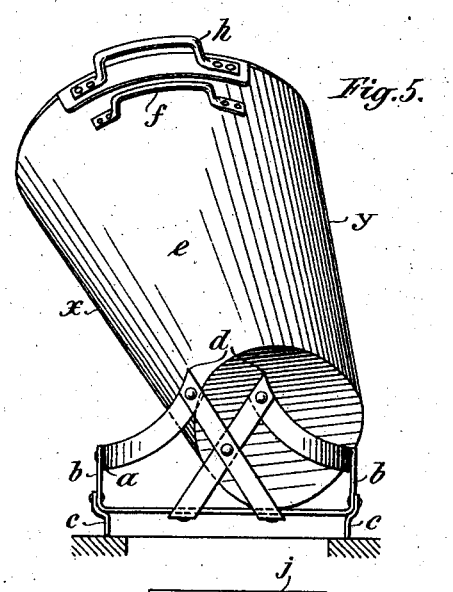
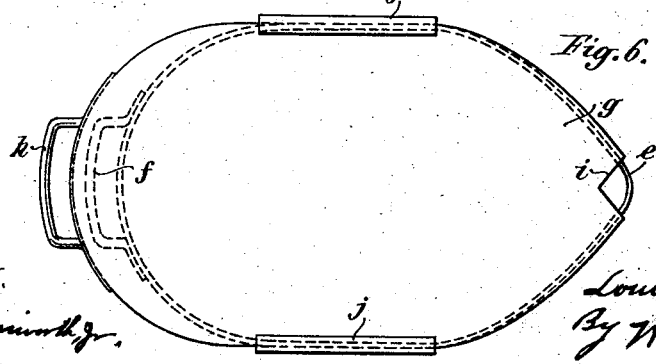

No. 765,679. Patented July 26, 1904.

UNITED STATES PATENT OFFICE.

LOUISE REINHARD, OF WILMERSDORF, NEAR BERLIN, GERMANY.

COMBINED ROASTING-PAN AND SKELETON SUPPORT.

SPECIFICATION forming part of Letters Patent No. 765,679, dated July 26, 1904.

Application filed June 26, 1903. Serial No. 163,153. (No model.)

*To all whom it may concern:*

Be it known that I, LOUISE REINHARD, widow, a subject of the Emperor of Germany, residing at Hohenzollernplatz, Wilmersdorf, near Berlin, Germany, have invented an Improved Combined Roasting-Pan and Skeleton Support, of which the following is a specification.

The subject of this invention is a roasting-pan provided with a skeleton support and possessing the characteristic feature that both parts of the roasting apparatus—the pan and the skeleton support—are, owing to their construction, brought in contact with one another in such a way as to permit of a perfect roasting, especially of poultry, legs of pork, and such articles, without the use of a roasting-oven.

When the ordinary cooking-pans are employed for roasting, it is difficult even when the greatest care is taken to prevent the piece being roasted from being browned unequally or only partially and in patches. When roasting is done in the ordinary pans without the use of the roasting-oven, it is quite easy for the side of the meat that lies on the bottom of the pan to be browned; but the uniform browning of certain roasts—for example, poultry or legs of pork—is either quite impossible or can be only managed when the greatest attention is paid to the matter by an accomplished cook. The roasting-pan with skeleton support which constitutes the subject of this invention obviates the aforesaid difficulty, and, owing to the construction of the device, it is possible to roast by its means to perfection without the use of a roasting-oven, and especially is this the case with small articles, such as poultry and legs of pork, &c.

The pointed oval form of the pan also facilitates the pouring off of the fat when fat things, such as geese, are being roasted, and to do this the pan does not require to be completely lifted off the skeleton support, but merely tilted slightly, with its sharp end resting on the V-formed skeleton-support ends.

The skeleton support having the V-formed ends, as above described, is intended to be placed over the fire-box of a cooking stove or range.

My invention is illustrated on the drawings annexed.

Figure 1 shows the skeleton support in plan view. Fig. 2 is a side view of the skeleton support with the pan set upright upon it. Fig. 3 is an end view of the same. Fig. 4 is an end view of the skeleton support with the the pan set upon it at an angle. Fig. 5 is a back view of the same. Fig. 6 is a plan view of the pan with its cover drawn back.

The skeleton support consists of a frame $a$ with angle cross-bars $b$ and supporting side pieces $c$. The side parts of the frame $a$ are bent upward at their ends, so as to form two points $d$, with a preferably angular space between them. The pan $e$, which is made of an oval form with a pointed end, as shown in Fig. 6, is provided with handles $f$ and has also a sliding cover $g$, fitting in guides $j\,j$. The cover has a handle $h$ and a notch $i$ to allow of fat being poured off.

Roasting with this pan is conducted as follows: After fat has been melted in the pan in the usual way and the inside of the pan greased, so as to prevent the skin or the meat adhering to it, the piece to be roasted is laid in place and then the pan is placed upright upon the skeleton support to begin with, (see Figs. 2 and 3,) and the roast is in this manner exposed to the action of the fire for a short time. Thereafter the pan is laid sidewise and obliquely upon the skeleton support, (see Figs. 4 and 5,) so that the one side, $x$, is exposed to the action of the fire. Subsequently the pan is turned to lie upon the other side, so that the side $y$ is exposed to the action of the fire.

The form of the skeleton support is such as to afford, through its edge and the turned-up ends of the sides, a good support for the pan in these oblique positions, so that it will not fall over. If any excess of fat has to be poured off during the roasting, the pan is tipped forward, and at the same time the cover $g$ is drawn back a little to let the fat run out by the notch $i$. When it is tilted, the pan finds a secure support in the angular space between the points $d$.

The skeleton support rests upon the jambs of the fire-box, as shown in Figs. 3, 4, and 5.

Having now fully described my invention, what I claim, and desire to secure by Letters Patent, is—

1. The herein-described skeleton support for a roasting-pan, said support having inverted-V-shaped ends separated by a V-shaped space for receiving the body of the pan when resting in an inclined position upon the bottom of the support, substantially as described.

2. The combination with a roasting-pan, of a skeleton support therefor having its ends bent upward and V-shaped recesses therein for receiving the body of the pan when resting in an inclined position upon the bottom of the support, substantially as described.

3. The combination with a roasting-pan, of a skeleton support therefor, said support having its ends formed into two points with a V-shaped space between them for receiving the body of the pan when resting in an inclined position upon the bottom of the support, substantially as and for the purposes set forth.

4. The combination with a roasting-pan made in oval form and having a pointed end, of a support for the pan having each of its ends formed into two points with a V-shaped space between them for receiving the body of the pan when resting in an inclined position upon the bottom of the support, substantially as described.

5. The combination with a roasting-pan made in oval form and having a pointed end, of a sliding lid therefor, said lid having a notch at one end, and a skeleton support for the pan having each of its ends formed into two points with a V-shaped space between them for receiving the body of the pan when resting in an inclined position upon the bottom of the support, substantially as and for the purposes set forth.

Signed at Berlin, Germany, this 12th day of June, 1903.

LOUISE REINHARD.

Witnesses:
WOLDEMAR HAUPT,
HENRY HASPER.